(12) United States Patent
Kagaya et al.

(10) Patent No.: US 9,703,053 B2
(45) Date of Patent: Jul. 11, 2017

(54) OPTICAL TRANSCEIVER

(71) Applicant: Oclaro Japan, Inc., Kanagawa (JP)

(72) Inventors: Osamu Kagaya, Tokyo (JP); Fumihide Maeda, Kanagawa (JP); Hiroyoshi Ishii, Kanagawa (JP); Koichi Omori, Chiba (JP); Koji Takeguchi, Kanagawa (JP)

(73) Assignee: OCLARO JAPAN, INC., Kanagawa (JP)

( * ) Notice: Subject to any disclaimer, the term of this patent is extended or adjusted under 35 U.S.C. 154(b) by 210 days.

(21) Appl. No.: 14/744,062

(22) Filed: Jun. 19, 2015

(65) Prior Publication Data

US 2015/0372760 A1 Dec. 24, 2015

(30) Foreign Application Priority Data

Jun. 20, 2014 (JP) .................................. 2014-126987

(51) Int. Cl.
*G02B 6/42* (2006.01)

(52) U.S. Cl.
CPC ......... *G02B 6/4215* (2013.01); *G02B 6/4246* (2013.01); *G02B 6/4292* (2013.01)

(58) Field of Classification Search
CPC ... G02B 6/4215; G02B 6/4246; G02B 6/4292
USPC ........................................................ 398/118
See application file for complete search history.

(56) References Cited

U.S. PATENT DOCUMENTS

| | | | |
|---|---|---|---|
| 6,369,924 B1 * | 4/2002 | Scharf ................. | G02B 6/4246 398/117 |
| 6,791,261 B1 | 9/2004 | Shimoda et al. | |
| 7,195,404 B1 * | 3/2007 | Dudley ............... | G02B 6/4201 385/92 |
| 7,917,037 B2 | 3/2011 | Liu et al. | |
| 8,488,334 B2 * | 7/2013 | McColloch .......... | H05K 9/0028 361/799 |
| 2003/0020986 A1 * | 1/2003 | Pang ..................... | G02B 6/4201 398/139 |
| 2004/0069997 A1 * | 4/2004 | Dair ..................... | G02B 6/4214 257/81 |
| 2005/0152701 A1 * | 7/2005 | Liu ....................... | G02B 6/4277 398/135 |
| 2007/0064760 A1 | 3/2007 | Kragh | |

(Continued)

FOREIGN PATENT DOCUMENTS

CN 1367938 A 9/2002
CN 101490858 A 7/2009
(Continued)

*Primary Examiner* — Dalzid Singh
(74) *Attorney, Agent, or Firm* — Mattingly & Malur, PC

(57) ABSTRACT

An optical transceiver is configured to use, as an electric signal, a digital modulation signal having a predetermined bit rate. The optical transceiver includes a case having a space for storing a component therein and a resistor being arranged between upper and lower surfaces of the space and having conductance of from 1 S/m to 1,000 S/m. The space has a height equal to or less than a wavelength in a free space of an electromagnetic wave of a frequency corresponding to the predetermined bit rate. At least a part of the height of the space is larger than a half of the wavelength. The height of the space is smaller than a width of the space. The width of the space is smaller than a depth of the space.

11 Claims, 15 Drawing Sheets

(56) References Cited

U.S. PATENT DOCUMENTS

| | | | |
|---|---|---|---|
| 2008/0240717 A1* | 10/2008 | Izumi | H04B 10/40 398/79 |
| 2009/0127578 A1 | 5/2009 | Masuya | |
| 2009/0180784 A1 | 7/2009 | Kagaya et al. | |
| 2010/0244991 A1 | 9/2010 | Washiro | |
| 2011/0150021 A1 | 6/2011 | Shveykin et al. | |
| 2012/0274208 A1 | 11/2012 | Chen et al. | |
| 2017/0054507 A1* | 2/2017 | Elahmadi | H04B 10/40 |

FOREIGN PATENT DOCUMENTS

| | | |
|---|---|---|
| CN | 101854194 A | 10/2010 |
| CN | 102057545 A | 5/2011 |
| CN | 102804493 A | 11/2012 |
| JP | 4-248703 A | 9/1992 |
| JP | 2008-249856 A | 10/2008 |
| JP | 2009-164308 A | 7/2009 |
| JP | 4428962 B2 | 12/2009 |

* cited by examiner

| | m | n | s | f [GHz] | degeneracy |
|---|---|---|---|---|---|
| | 0 | 1 | 6 | 25.43 | 1 |
| | 2 | 1 | 2 | 25.67 | 2 |
| 100GbE → | 3 | 0 | 5 | 25.78 | 1 |
| | 2 | 1 | 3 | 26.30 | 2 |
| | 1 | 1 | 6 | 26.50 | 2 |
| | 1 | 0 | 10 | 26.69 | 1 |
| | 0 | 1 | 7 | 27.06 | 1 |
| | 3 | 0 | 6 | 27.15 | 1 |
| | 2 | 1 | 4 | 27.16 | 2 |
| OTU4 → | 2 | 0 | 9 | 27.46 | 1 |
| | 1 | 1 | 7 | 28.06 | 2 |
| | 2 | 1 | 5 | 28.23 | 2 |
| | 3 | 0 | 7 | 28.67 | 1 |

FIG.16

| m | n | s | f [GHz] | degeneracy |
|---|---|---|---|---|
| 3 | 1 | 10 | 25.34 | 2 |
| 3 | 0 | 13 | 25.44 | 1 |
| 0 | 1 | 12 | 25.52 | 1 |
| 6 | 0 | 7 | 25.62 | 1 |
| 5 | 0 | 10 | 25.67 | 1 |
| 2 | 0 | 14 | 25.69 | 1 |
| 1 | 1 | 12 | 25.80 | 2 |
| 4 | 0 | 12 | 25.85 | 1 |
| 5 | 1 | 6 | 25.88 | 2 |
| 4 | 1 | 9 | 26.11 | 2 |
| 7 | 0 | 1 | 26.29 | 1 |
| 7 | 0 | 2 | 26.47 | 1 |
| 6 | 0 | 8 | 26.51 | 1 |
| 3 | 1 | 11 | 26.59 | 2 |
| 1 | 0 | 15 | 26.59 | 1 |
| 2 | 1 | 12 | 26.60 | 2 |
| 5 | 1 | 7 | 26.64 | 2 |
| 6 | 1 | 0 | 26.71 | 1 |
| 7 | 0 | 3 | 26.75 | 1 |
| 6 | 1 | 1 | 26.76 | 2 |
| 5 | 0 | 11 | 26.90 | 1 |
| 6 | 1 | 2 | 26.94 | 2 |
| 0 | 1 | 13 | 26.99 | 1 |
| 3 | 0 | 14 | 27.02 | 1 |
| 7 | 0 | 4 | 27.15 | 1 |
| 4 | 1 | 10 | 27.21 | 2 |
| 6 | 1 | 3 | 27.22 | 2 |
| 1 | 1 | 13 | 27.25 | 2 |
| 4 | 0 | 13 | 27.30 | 1 |
| 2 | 0 | 15 | 27.37 | 1 |
| 6 | 0 | 9 | 27.48 | 1 |
| 5 | 1 | 8 | 27.49 | 2 |
| 6 | 1 | 4 | 27.61 | 2 |
| 7 | 0 | 5 | 27.66 | 1 |
| 3 | 1 | 12 | 27.89 | 2 |
| 2 | 1 | 13 | 28.01 | 2 |
| 6 | 1 | 5 | 28.11 | 2 |
| 5 | 0 | 12 | 28.19 | 1 |
| 7 | 0 | 6 | 28.27 | 1 |
| 1 | 0 | 16 | 28.33 | 1 |
| 4 | 1 | 11 | 28.38 | 2 |
| 5 | 1 | 9 | 28.43 | 2 |
| 0 | 1 | 14 | 28.49 | 1 |

100GbE→ (at row between 2,0,14,25.69,1 and 1,1,12,25.80,2)

OTU4→ (at row between 7,0,5,27.66,1 and 3,1,12,27.89,2)

OPTICAL TRANSCEIVER

CROSS-REFERENCE TO RELATED APPLICATION

The present application claims priority from Japanese Application JP 2008-126987, the content of which is hereby incorporated by reference into this application.

BACKGROUND OF THE INVENTION

1. Field of the Invention

This invention relates to an optical transceiver.

2. Description of the Related Art

Along with the popularization of a broadband network in recent years, attempts have been made to achieve higher speed, downsizing, and lower costs for an optical transceiver (optical transceiver module) for optical fiber transmission. To achieve the higher speed, at present, a 100-Gbit/s-class optical transceiver has begun to replace a related-art optical transceiver having a bit rate of about 10 Gbit/s. To achieve the downsizing, Multi Source Agreement (MSA) of the Ethernet (trademark) system is the basis and at present, a case volume has been reduced from CFP to CFP2, CFP4, and QSFP28 (MSA standards, respectively) (see http://www.cfp-msa.org/).

According to the MSA standard, serial data of 100 Gbit/s is transmitted as a 4-wavelength multiplexed optical signal through an optical fiber. On the surface of a printed circuit board of the optical transceiver, channels (transmission lines) including digital modulation signal transmission lines are formed. Four channels are formed for transmission, and four channels are formed for reception. A bit rate of an electric signal transmitted through each channel is 25.78 Gbit/s (more specifically, 25.78125 Gbit/s in the case of the method compliant with IEEE 802.3ba), or both 25.78 Gbit/s and 27.95 Gbit/s (more specifically, 27.95249339 Gbit/s in the case of the OTU4 method compliant with ITU-T G.959.1).

In a network device on which the optical transceiver is mounted, it is required to keep intensity of an unnecessary electromagnetic wave generated by the device equal to or less than a limit value defined by the law. For example, in the U.S., a limit value 53.9 dB (µV/m) (in the case of Class B standard, distance 3 m, and frequency range of 1 GHz to 40 GHz), which is defined in FCC Part 15 Subpart B standard, or lower must be satisfied. In a large-sized network device, several to several hundreds of optical transceivers are mounted in slots on the front surface in many cases. In each optical transceiver, an integrated circuit (IC) for driving a digital modulation signal generates a switching noise based on its operation bit rate. This leads to generate an unnecessary electromagnetic wave from the IC or the transmission line. A main component of the unnecessary electromagnetic wave is generated at a frequency based on the operation bit rate. Specifically, when a bit rate is 25.78 Gbit/s, the main component is generated at a frequency of 25.78 GHz. When a bit rate is 27.95 Gbit/s, the main component is generated at a frequency of 27.95 GHz. A design technology for reducing radiation of such an unnecessary electromagnetic wave to the outside of the device is important for both the network device and the optical transceiver.

A size and a rough shape of a case (also referred to as housing, shell, or chassis) of the optical transceiver are defined by each MSA. The case includes a metallic component usually formed by die-casing or sheet-metal processing. Accordingly, a shield effect of the case of the optical transceiver with respect to the electromagnetic wave is relatively high. In reality, however, there may be many cases where the above-mentioned numerical values defined by the law are not satisfied even with the shield effect of the case.

In order to prevent any of an unnecessary electromagnetic wave generated in the case from leaking to the outside by achieving the higher shield effect of the case of the optical transceiver, a gap between fitted portions of the case components and a gap to be generated between an optical connector coupled to the optical fiber or an electric connector coupled to the network device and the case component are reduced as much as possible. Specifically, it is ideal to set lengths of all the gaps with respect to a wavelength in air at a frequency of concern to be smaller than a ¼ wavelength, or eliminate the gaps. However, it is difficult to obtain a high shield effect irrespective of manufacturing fluctuations, and achievement thereof is impractical because of an accompanying increase in manufacturing cost.

As another method for reducing the unnecessary electromagnetic wave from the optical transceiver, there is a method of reducing, in the case, the unnecessary electromagnetic wave generated therein. For the purpose of achieving this, for example, a plurality of structures has been provided as described below.

Specifically, Japanese Patent Application Laid-open No. 2009-164308, U.S. Pat. No. 7,195,404, Japanese Patent Application Laid-open No. Hei 04-248703, Japanese Patent No. 4428962, and white paper of Laird HP "Theory and Application of RF/Microwave Absorbers" http://www.eccosorb.com/resource-white-papers.htm, file name: "Absorbers_White_Paper.pdf" concern cavity resonance of the metallic case. When the frequency of the unnecessary electromagnetic wave of concern and an eigenmode frequency of the cavity resonance of the metallic case are equal to or near each other, unnecessary radiation from the optical transceiver may increase. Therefore, according to Japanese Patent Application Laid-open No. 2009-164308, this problem is prevented by employing a structure in which the eigenmode frequency in the metallic case is shifted. According to U.S. Pat. No. 7,195,404, Japanese Patent Application Laid-open No. Hei 04-248703, Japanese Patent No. 4428962, and the white paper of Laird HP "Theory and Application of RF/Microwave Absorbers", by arranging a wave absorber using a magnetic material or a resistor at a predetermined location in the metallic case to cause a loss in magnetic or electric field, energy of an electromagnetic wave of the cavity resonance is attenuated.

According to U.S. Pat. No. 7,917,037 and Japanese Patent Application Laid-open No. 2008-249856, while there is no mention of cavity resonance, nor reduction thereof is a purpose, a wave absorber is arranged at a predetermined location inside the case of the optical transceiver. Specifically, according to U.S. Pat. No. 7,917,037, the unnecessary electromagnetic wave is attenuated by arranging nonconductive (or quasi-nonconductive) wave absorbers at two upper and lower locations of the printed circuit board and placing the wave absorbers at the locations nearer to an electromagnetic interference (EMI) source (excitation source). The wave absorbers are not fixed to the case. According to Japanese Patent Application Laid-open No. 2008-249856, by arranging wave absorbers using magnetic materials to serve as shields between two printed circuit boards and upper and lower cases, radiation from edges of the boards is attenuated. Further, the wave absorbers are arranged to be bonded to top and bottom surfaces without any space in the case. No wave absorber is arranged in an intermediate region of the two printed boards.

SUMMARY OF THE INVENTION

Most of the above-mentioned related art are technologies for reducing cavity resonance in the 10-Gbit/s-class optical transceiver, such as that based on 10 Gigabit Small Form Factor Pluggable (XFP) or at the frequency of 10 GHz or less. Our investigations have found the following problems about the generation of an unnecessary electromagnetic wave and cavity resonance in the 100-Gbit/s-class optical transceiver.

(1) When calculated based on the internal space size of the metallic case, a large number of eigenmodes are present near frequencies of 25.78 GHz and 27.95 GHz. (2) The eigenmodes include, hitherto absent in the 10-Gbit/s-class optical transceiver, an eigenmode generating nodes and antinodes in a height direction in an electric field distribution. (3) Even when the wave absorbers using magnetic materials are arranged to be bonded to the top and bottom surfaces in the case, generation of cavity resonance is observed, and suppression of the unnecessary electromagnetic wave is insufficient.

The problems of (1) and (2) occur, for example, due to reduction of a wavelength by 0.4 caused by a change of the frequency of the unnecessary electromagnetic wave from 10 GHz to 25 GHz while internal space sizes of the cases are approximately equal between the XFP and the CFP4. Concerning the problem (3), many of commercially available wave absorbent sheets using magnetic materials provide great attenuation effects at a frequency of 1 GHz or less exhibiting high specific magnetic permeability and a high magnetic loss (imaginary component of specific magnetic permeability). However, over 1 GHz, the specific magnetic permeability is known to sharply fall along with the increase of the frequency (Snoek's limit) and at the frequency of 25 GHz or over, desired attenuation characteristics with respect to a magnetic field cannot be obtained.

Further, the currently obtainable wave absorbers using magnetic material are all high-priced, which is a problem from the standpoint of achieving low cost for the optical transceiver.

The above-mentioned related art respectively have the following problems, and thus are unsuitable for solving the problems (1) to (3).

In Japanese Patent Application Laid-open No. 2009-164308, a large number of eigenmodes are present near the frequencies of 25.78 GHz and 27.95 GHz as described above in the problem (1). It is therefore difficult to avoid the influence of the cavity resonance by shifting the eigenmode frequency in the metallic case.

In the case of U.S. Pat. No. 7,195,404, U.S. Pat. No. 7,917,037, Japanese Patent Application Laid-open No. 2008-249856, and the white paper of Laird HP "Theory and Application of RF/Microwave Absorbers", the wave absorbers using only the magnetic materials are arranged at the predetermined locations in the metallic case. However, it is difficult to avoid the influence of the cavity resonance because of the problem (3).

The wave absorbers using only the resistors in the case of U.S. Pat. No. 7,195,404 and Japanese Patent Application Laid-open No. Hei 04-248703 and the wave absorbers using both the resistors and the magnetic materials in the case of Japanese Patent No. 4428962 are arranged at the predetermined locations in the metallic case. However, this arrangement is unsuitable for attenuating the eigenmode corresponding to the problem (2). It is therefore difficult to avoid the influence of the cavity resonance.

One or more embodiments of the present invention has been made in view of the above-mentioned problems, and an object of one or more embodiments of the present invention is to provide, for example, concerning an optical transceiver using a digital modulation signal having a bit rate of 25 Gbit/s or higher as an electric signal, an optical transceiver capable of reducing cavity resonance in a metallic case and achieving low cost.

(1) In one or more embodiments of the present invention, an optical transceiver is configured to use, as an electric signal, a digital modulation signal having a predetermined bit rate. The optical transceiver includes a case having a space for storing a component therein and a resistor being arranged between upper and lower surfaces of the space and having conductance of from 1 S/m to 1,000 S/m. The space has a height equal to or less than a wavelength in a free space of an electromagnetic wave of a frequency corresponding to the predetermined bit rate. At least a part of the height of the space is larger than a half of the wavelength. The height of the space is smaller than a width of the space. The width of the space is smaller than a depth of the space.

(2) In the optical transceiver according to (1), at least a part of the resistor is positioned at a height-direction center of the space formed in the case.

(3) In the optical transceiver according to one of (1) and (2), the bit rate is equal to or less than 25.78 Gbit/s, and the height of the space is less than 11.6 mm.

(4) In the optical transceiver according to one of (1) to (3), the bit rate is one of 25.78 Gbit/s and 27.95 Gbit/s, and at least a part of the height of the space is larger than 5.8 mm. The height of the space is less than 10.7 mm.

(5) In the optical transceiver according to one of (1) to (4), the resistor has an extending part in a width direction of the case.

(6) In the optical transceiver according to one of (1) to (5), a width of the resistor is set to a value of 86% or more and 100% or less of a width of the case.

(7) In the optical transceiver according to one of (1) to (6), the resistor comprises a nonmagnetic member.

(8) In the optical transceiver according to one of (1) to (7), wherein the resistor is made of a material using one of graphite and carbon black as a filler in resin.

(9) In the optical transceiver according to one of (1) to (8), the resistor comprises a support member configured to support the component.

(10) In the optical transceiver according to one of (1) to (9), the component comprises at least one of an optical fiber or an optical element module.

(11) In the optical transceiver according to (9), the component comprises two printed circuit boards, and a part of the resistor having an extending part in a width direction of the case is positioned between the two printed circuit boards.

BRIEF DESCRIPTION OF THE DRAWINGS

FIG. 16 is a table for showing an eigenmode of cavity resonance according to the third embodiment.

DETAILED DESCRIPTION OF THE INVENTION

Figure 1:
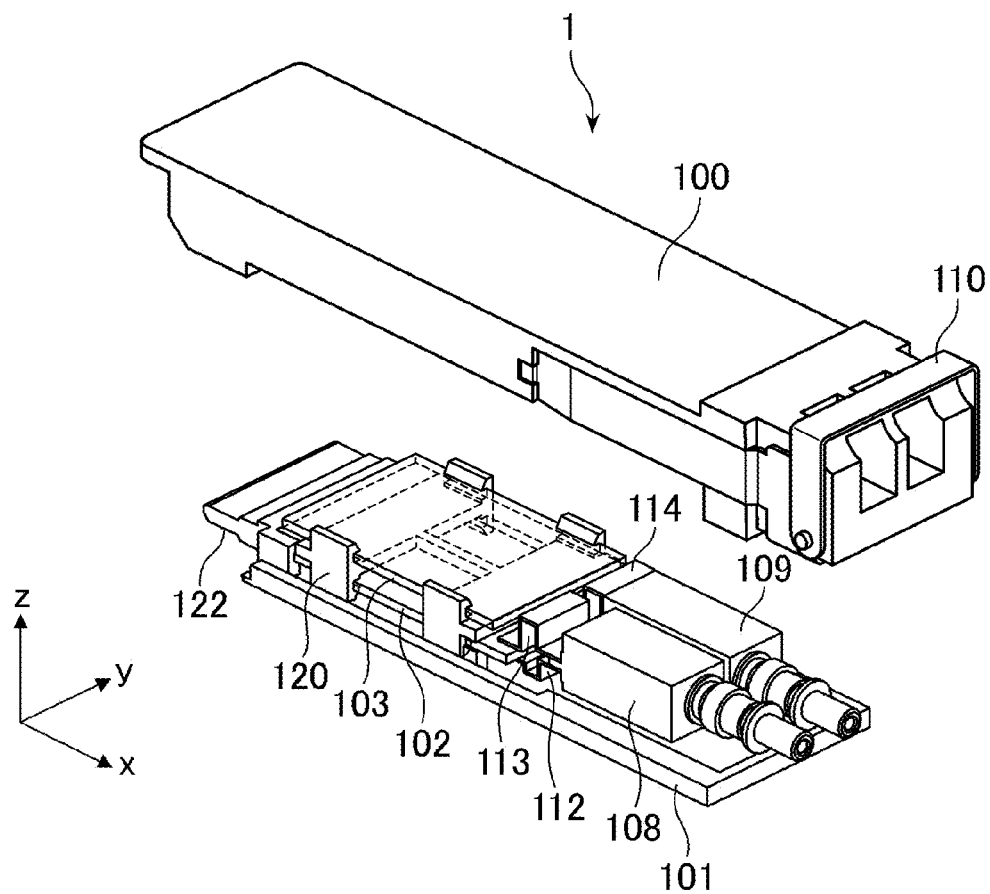
FIG. 1 is a vertically exploded perspective view for illustrating an internal structure of an optical transceiver according to a first embodiment of this invention.

Referring to the accompanying drawings, embodiments of this invention are described below. In the drawings, the same or similar components are denoted by the same reference symbols, and repetitive description thereof is omitted.

First Embodiment

Figure 2:
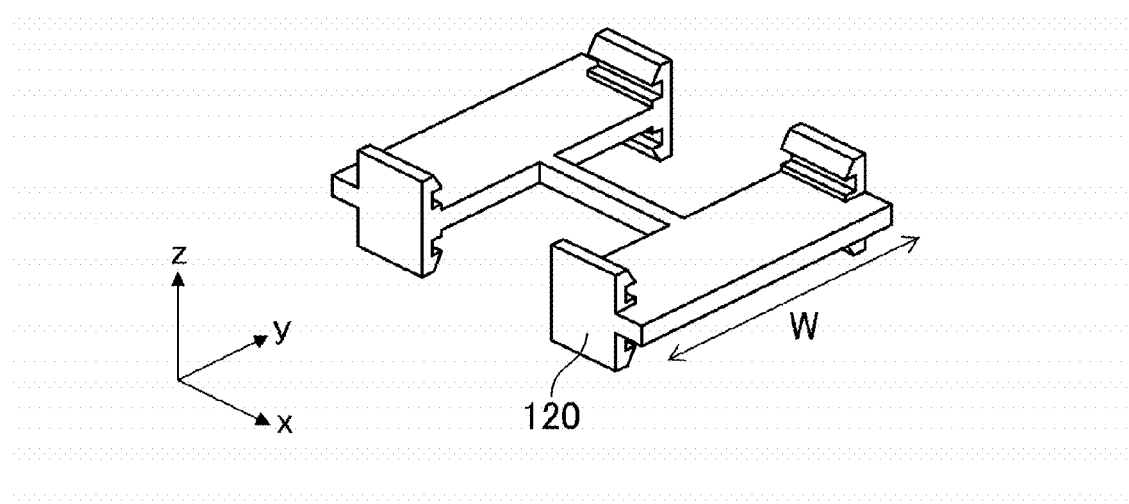
FIG. 2 is a structural diagram for illustrating a substrate holder to be mounted on the optical transceiver according to the first embodiment.
Figure 3:
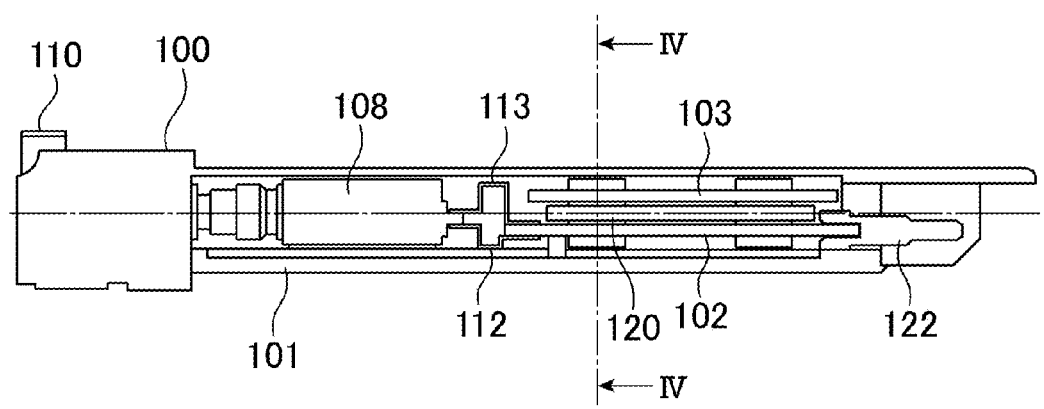
FIG. 3 is a sectional view of the optical transceiver according to the first embodiment seen from a side surface direction.
Figure 4:
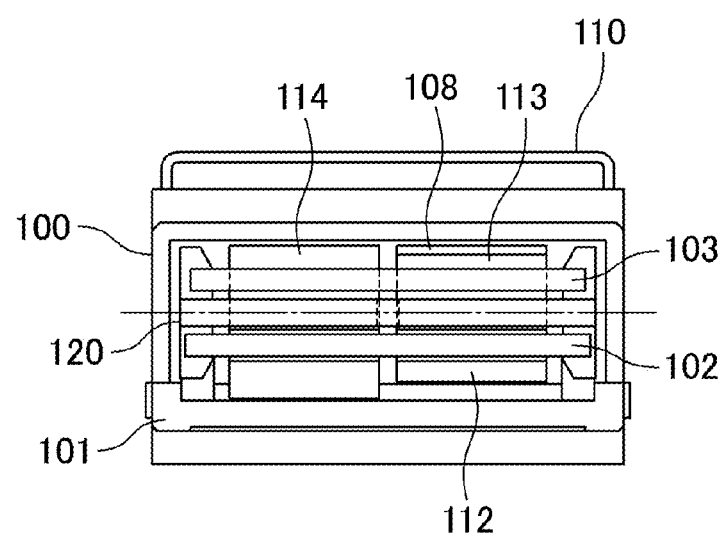
FIG. 4 is a sectional view of the optical transceiver according to the first embodiment at a position of the substrate holder seen from a rear side.
Figures 5, 6:
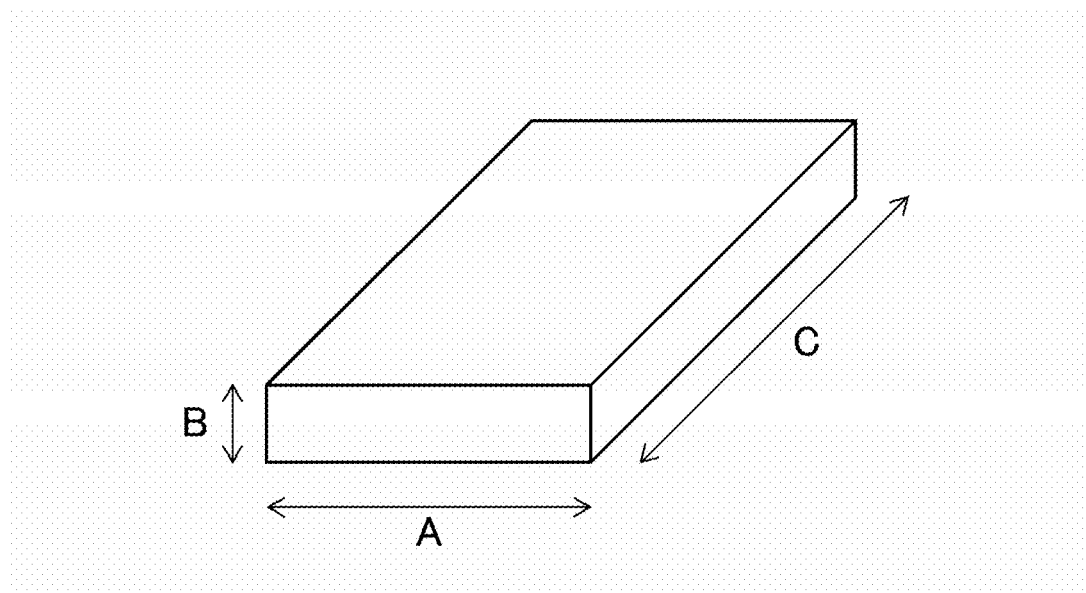
FIG. 5 is a diagram for illustrating a rectangular parallelepiped approximating an internal space of the optical transceiver according to the first embodiment.
FIG. 6 is a table for showing an eigenmode of cavity resonance according to the first embodiment.
Figure 7A:
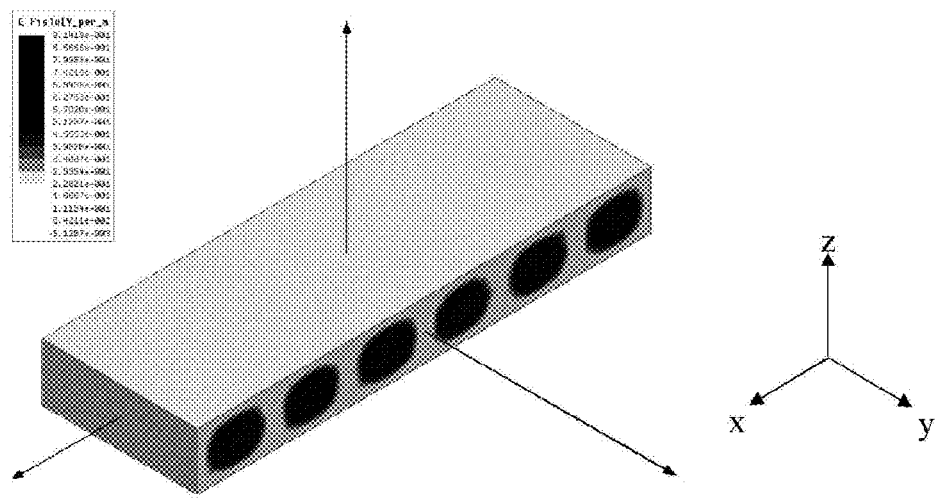
FIGS. 7A and 7B are diagrams each for illustrating an electric field intensity distribution of the eigenmode according to the first embodiment.
Figure 7B:
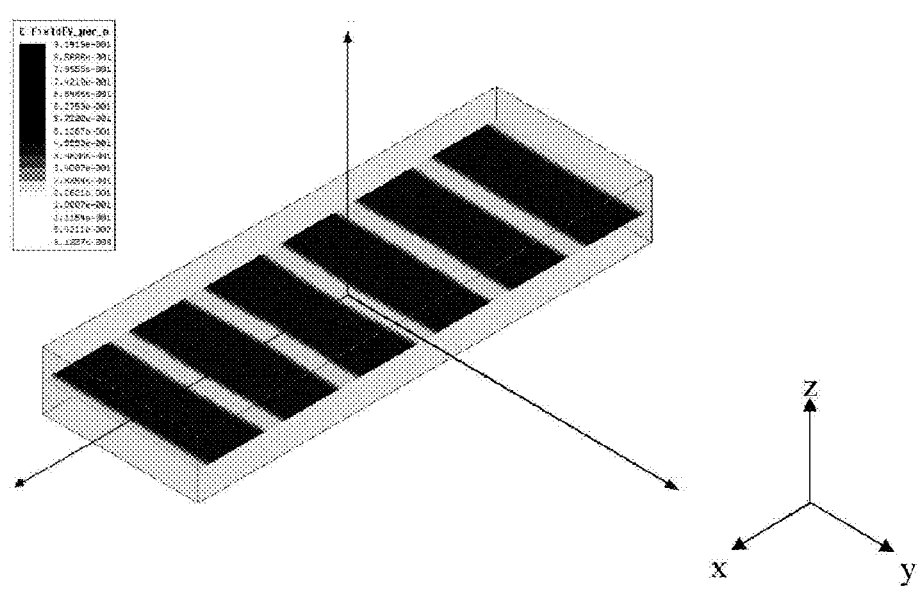
Figure 8A:
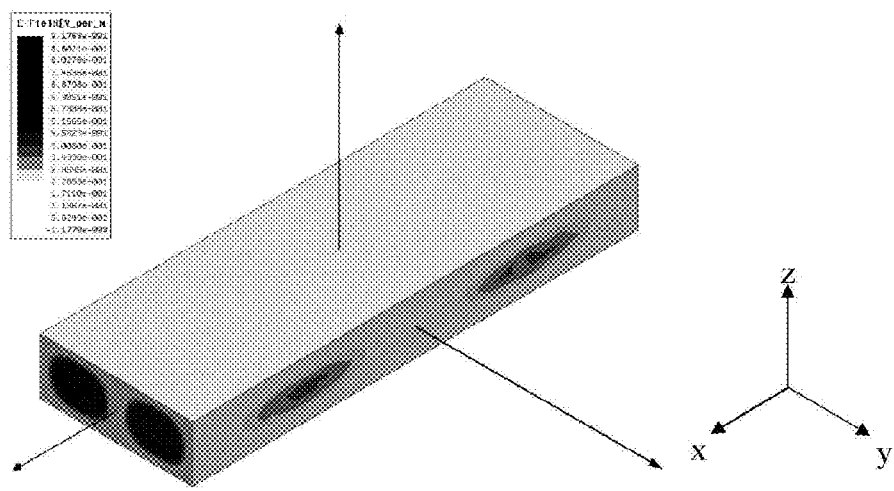
FIGS. 8A and 8B are diagrams each for illustrating an electric field intensity distribution of the eigenmode according to the first embodiment.
Figure 8B:
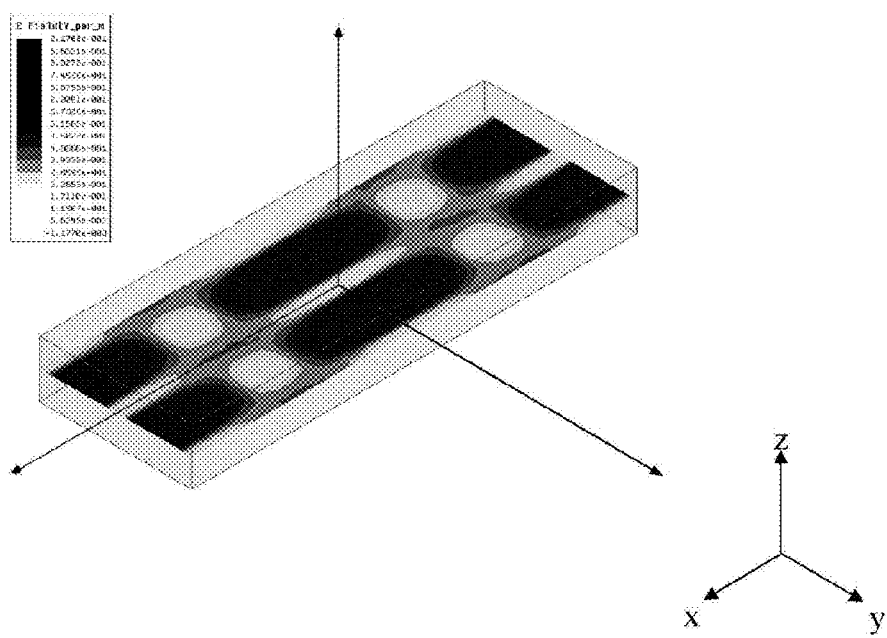
Figure 9:
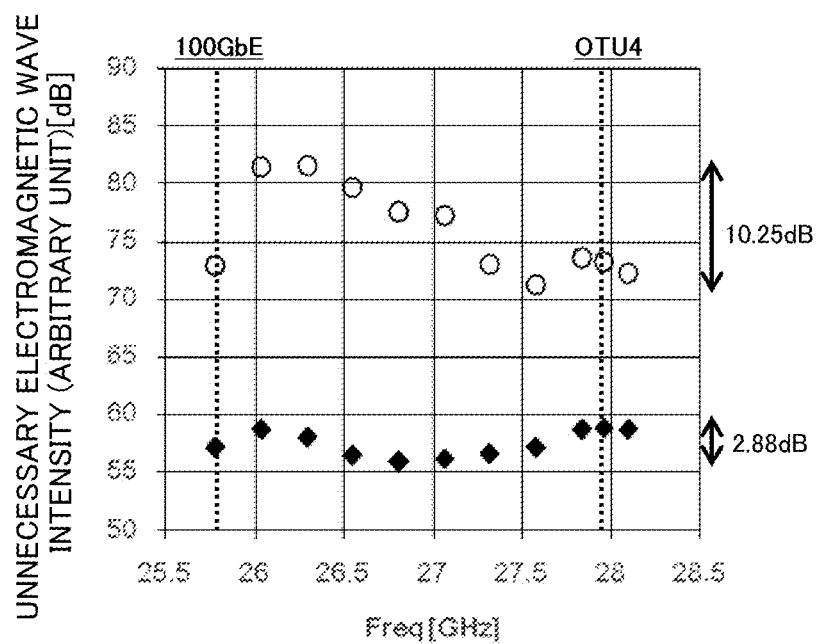
FIG. 9 is a graph for showing a calculation result of unnecessary electromagnetic wave intensity of the optical transceiver exhibiting effects according to the first embodiment.

A first embodiment of this invention is described referring to FIGS. 1 to 9. FIG. 1 is a vertically exploded perspective view for illustrating an internal structure of an optical transceiver according to the first embodiment of this invention. FIG. 2 is a structural diagram for illustrating a substrate holder to be mounted on the optical transceiver according to the first embodiment of this invention. FIG. 3 is a sectional view of the optical transceiver according to the first embodiment of this invention seen from a side surface direction, in particular, is an illustration of a section at a position passing through a center of the optical transceiver. FIG. 4 is a sectional view of the optical transceiver according to the first embodiment of this invention at a position of the substrate holder seen from a rear side, in particular, is an illustration of a section at a position taken along the line IV-IV of FIG. 3. FIG. 5 is a diagram for illustrating a rectangular parallelepiped approximating an internal space of the optical transceiver according to the first embodiment of this invention. FIG. 6 is a table for showing an eigenmode of cavity resonance according to the first embodiment of this invention. FIGS. 7A to 8B are diagrams each for illustrating an electric field intensity distribution of the eigenmode according to the first embodiment of this invention. FIG. 9 is a graph for showing a calculation result of unnecessary electromagnetic wave intensity of the optical transceiver exhibiting effects according to the first embodiment of this invention.

The optical transceiver according to this embodiment is, for example, an optical transceiver compliant with CFP4 MSA Standard. First, referring to FIGS. 1 to 4, an example of an optical transceiver 1 according to this embodiment is described.

In FIG. 1, an outer side of the optical transceiver 1 mainly includes an upper case 100, a lower case 101, and a bail 110. In the following, an x direction, an opposite direction thereof (−x direction), a z direction, and an opposite direction thereof (−z direction) in FIG. 1 are respectively defined to be a front direction, a rear direction, an upper direction, and a lower direction.

The optical transceiver 1 is operated by inserting the optical transceiver 1 into a network device (not shown) from a rear side and inserting a connector of an optical fiber from a front side. In FIG. 1, in a cavity space formed by the upper case 100 and the lower case 101, two printed circuit boards 102 and 103, a substrate holder 120, a transmitter optical sub-assembly (TOSA) 108, and a receiver optical sub-assembly (ROSA) 109 are arranged. Flexible printed boards 112, 113, and 114 or the like are arranged between each of the printed circuit boards 102 and 103 and each of the TOSA 108 and the ROSA 109, and main signal wiring, grounding wiring, voltage supply wiring, or current supply wiring of 25 Gbit/s (or 28 Gbit/s) is coupled thereto.

On the printed circuit board 102, a main signal processing IC or a chip component of clock data recovery (CDR) or the like (not shown) is mounted. On the rear side of the printed circuit board 102, a plug connector 122 is arranged to be used for coupling to the network device. The plug connector 122 electrically couples differential signals of 25 Gbit/s (or 28 Gbit/s) or the like of totally eight channels, namely, four channels for a transmission side and four channels for a reception side between the printed circuit board 102 and the network device. The plug connector 122 is exposed to the outside through slots on rear sides of the upper and lower cases 100 and 101, and functions to insert/remove a live wire. On the printed circuit board 103, a micro-controller or a circuit (not shown) for controlling the TOSA 108 and the ROSA 109 is mounted.

The substrate holder 120 functions to hold the printed circuit boards 102 and 103. By the substrate holder 120, a position of the printed circuit board 103 relative to the printed circuit board 102 is fixed. While dependent on a size of the space formed by the upper and lower cases 100 and 101, a width of the substrate holder 120 is set to, for example, 19 mm (W). Specifically, the substrate holder 120 has planar extending parts in a width direction of the upper or lower case 100 or 101 at a plurality of locations, for example, two locations illustrated in FIG. 2. Each planar shape is, for example, a surface having a width of 19 mm (W) and a depth of 7 mm. Other shapes may be employed for the extending part as long as the extending part is roughly parallel to a top surface or the like of the upper case 100. It is preferred that the substrate holder 120 be formed of a resistor having conductance set within a range of from 1 S/m to 1,000 S/m. Further, it is more preferred that the substrate holder 120 be formed of a resistor having conductance set within a range of from 10 S/m to 100 S/m. For example, the substrate holder 120 is made of a nylon resin using carbon black as a filler, and conductance thereof is set to 10 S/m. The case where the substrate holder 120 is formed of the resistor has been described above. However, the resistor may be provided separately from the substrate holder 120. Specifically, for example, in this case, in place of forming the substrate holder 120 of the resistor, a resistor having a planar extending part in the width direction of the upper or lower case 100 or 101 may be provided separately from the substrate holder 120.

As materials for the upper and lower cases 100 and 101, metals such as zinc or aluminum are used. The upper and lower cases 100 and 101 may be formed by cutting. However, the upper and lower cases 100 and 101 can be integrally formed at low cost by die-casting. While dependent on thicknesses of the upper and lower cases 100 and 101, the size of the internal space formed by the upper and lower cases 100 and 101 is set to, for example, a width of 20.1 mm (A), a height of 7.4 mm (B), and a depth of 58.5 mm (C).

When presuming that the optical transceiver 1 is designed to be compatible to both methods of 25.78 Gbit/s and 27.95 Gbit/s (dual mode), frequencies of unnecessary electromagnetic waves to be taken into consideration are frequencies of 25.78 GHz and 27.95 GHz. Wavelengths $\lambda g$ in free spaces of the respective frequencies are 11.6 mm and 10.7 mm. The height 7.4 mm (B) of the internal space is a value larger than ½ (5.8 mm and 5.35 mm) of the wavelengths $\lambda g$. The height 7.4 mm (B) of the internal space is the value not exceeding the wavelengths $\lambda g$ (11.6 mm and 10.7 mm).

As illustrated in the sectional views of FIGS. 3 and 4, the substrate holder 120 is arranged between upper and lower surfaces of the space in the case. Specifically, for example, a part of the substrate holder 120 extending in a case width direction is arranged so as to be positioned between the upper and lower surfaces of the space in the case. It is desired that the part extending in the case width direction be arranged at a position passing through a center of a case height. As illustrated in the sectional view of FIG. 4, a width of the substrate holder 120 is extended to be close to the width of the case internal space, and set to a size equivalent to 95% of the width. In FIGS. 3 and 4, the height center of the internal space is indicated by the chain line. FIGS. 3 and 4 are respectively examples of sectional views in the y direction and the x direction.

Next, referring to FIGS. 5 to 9, operations and effects of this embodiment are described. The internal space surrounded with the metallic upper and lower cases 100 and 101 in the optical transceiver 1 can be regarded, when presuming that an opening of the plug connector 122 part is sufficiently small, for example, as illustrated in FIG. 5, as a cavity surrounded with conducting walls. Thus, in order to describe a mechanism according to this embodiment, the cavity of the internal space is approximated by a rectangular parallelepiped. An eigenmode generated in the rectangular parallelepiped cavity surrounded with the conducting walls is well known, and a frequency fr of each eigenmode is represented by the following expression (1).

$$f_r = \frac{c}{2\pi}\sqrt{\left(\frac{m\pi}{A}\right)^2 + \left(\frac{n\pi}{B}\right)^2 + \left(\frac{s\pi}{C}\right)^2} \tag{1}$$

In the expression (1), A is a width (length in y direction) of the rectangular parallelepiped, B is a height (length in z direction) of the rectangular parallelepiped, C is a depth (length in x direction) of the rectangular parallelepiped, c is a light velocity in vacuum, and m, n, and s are integers. For the A, B, and C, it is presumed that a relationship of B<A<C is set according to a definition often used for a waveguide. When an excitation source having a frequency close to fr is set at a position for exciting each eigenmode, cavity resonance is generated in the case. In the case of the optical transceiver compliant with the CFP4 MSA, an external dimension is defined by the MSA, and a dimension of the internal space is a value obtained by subtracting the thickness of the case from the external dimension. Specifically, for example, the dimension of the internal space is 20.1 mm×7.4 mm×58.5 mm.

Conditions for generating a standing wave in a cavity height direction of the rectangular parallelepiped can be calculated by the expression (1). With n=1, specifically, to generate an antinode at a height center and nodes at upper and lower ends in the electric field intensity distribution, when a wavelength in a free space of an electromagnetic wave is $\lambda g$ (=c/f), at least B needs to be larger than $\lambda g/2$. Further, with n=2, specifically, to generate nodes at the height center and the upper and lower ends and antinodes at heights ¼×B and ¾×B in the electric field intensity distribution, at least B needs to be larger than $\lambda g$.

Wavelengths $\lambda g$ in the free space at frequencies 25.78 GHz and 27.95 GHz are 11.6 mm and 10.7 mm. In the case of the CFP4, the height B of the internal space is 7.4 mm, and thus an eigenmode of n=1 is generated while no eigenmode of n=2 (or more) is generated. As described below, in the case of the CFP2, similarly, the height B of the internal space is 10.4 mm, and thus an eigenmode of n=1 is generated while no eigenmode of n=2 (or more) is generated.

In order to efficiently attenuate the eigenmode of n=1, a resistor having an extending part in the case width direction may be arranged at the height center of the internal space, in other words, a part that is the antinode in the electric field intensity distribution, and surface impedance thereof may be adjusted to a value in which reflection of the electromagnetic wave is difficult to occur. With an eigenmode of n=0, a similar electric field distribution occurs at any position in the height direction. Thus, the eigenmode can be attenuated with the above-mentioned arrangement of the resistor. No eigenmode of n=2 is generated, and thus the above-mentioned arrangement of the resistor can deal with all the eigenmodes.

FIGS. 6 to 8B are results of calculating eigenmodes generated in the cavity of the rectangular parallelepiped by a three-dimensional electromagnetic field analysis method. As shown in the table of FIG. 6, a large number of eigenmodes are present near the frequencies of 25.78 GHz and 27.95 GHz. A frequency of each eigenmode matches the expression (1) well and, as predicted above, a mode of n=1 is generated while no mode of n=2 is generated. A mode in which one of n, m, and s is 0 is only a transverse electric mode (TE mode). However, in a mode where none of n, m, and s is 0, two modes, namely, a TE mode and a transverse magnetic mode (TM mode), are degenerated.

FIGS. 7A to 8B are examples of electric field intensity distributions of eigenmodes. FIGS. 7A and 7B respectively are an electric field intensity distribution on a conducting wall surface and an electric field intensity distribution on a surface of the height center of a (0, 1, 6) TE mode generated at a frequency of 25.43 GHz. A magnitude of electric field intensity is indicated by gradation. As the gray level is higher, the electric field intensity is higher. As the gray level is lower, the electric field intensity is lower. An antinode part in which electric field intensity is high is generated on a surface of a center. In order to efficiently attenuate this eigenmode, a wide resistor having a horizontally extending part may be arranged at the height center. On the other hand, no electric field is generated in upper and lower surfaces. Thus, for example, even when resistors are arranged in the upper and lower surfaces (i.e., top and bottom surfaces in the case), attenuation effect cannot be obtained for this eigenmode.

FIGS. 8A and 8B respectively are an electric field intensity distribution on a conducting wall surface and an electric field intensity distribution on a surface of the height center of a (2, 1, 2) TM mode generated at a frequency of 25.67 GHz. An antinode part in which electric field intensity is high is generated on a surface of a center. In order to efficiently attenuate this eigenmode, a wide resistor having a horizontally extending part may be arranged at the height center. On the other hand, no electric field is generated in upper and lower surfaces. Thus, even when resistors are arranged in the upper and lower surfaces (i.e., top and bottom surfaces in the case), attenuation effect cannot be obtained for this eigenmode.

Thus, our studies have discovered that by arranging the resistor between the upper and lower surfaces of the internal space of the case and forming the resistor into the shape having the extending part in the case width direction, all the eigenmodes near 25 GHz and 28 GHz possibly generated inside the case of the optical transceiver can be attenuated.

In an actual optical transceiver, a shape of an internal space surrounded with upper and lower cases is not limited to a rectangular parallelepiped. Components made of metals such as TOSA and ROSA are arranged. Accordingly, a resonance phenomenon becomes more complex. However, the above-mentioned mechanism similarly functions.

FIG. 9 is a graph for showing a result of calculating unnecessary electromagnetic wave intensity in a structure of the optical transceiver illustrated in FIG. 1 by the three-dimensional electromagnetic field analysis method. A frequency range was 25.78 GHz to 28.25 GHz, and frequency dependency was calculated, as one index, within this range. A result when the substrate holder 120 according to this embodiment was used is indicated by a mark □. The substrate holder 120 had conductance of 10 S/m. For comparison, a result when only the substrate holder 120 was removed in the same structure is indicated by a mark o. When the substrate holder 120 was absent, a large number of strong resonance modes were observed in the case, and unnecessary electromagnetic wave intensity greatly fluctuated with a change of a frequency. A dispersion thereof exceeded 10 dB. On the other hand, when the substrate holder 120 was applied, resonance in the case was suppressed, a dispersion of unnecessary electromagnetic wave intensity caused by a frequency change was small, namely, 3 dB or less, and thus fluctuation due to a frequency was reduced. Further, the unnecessary electromagnetic wave intensity was reduced by 12 dB or more by the application of the substrate holder 120.

As described above, according to this embodiment, the substrate holder 120 has the extending parts in the case width direction at the plurality of locations (two locations). Accordingly, the substrate holder 120 has the extending parts in the case width direction at the two locations near the front and rear ends, and the resistor is arranged between the upper and lower surfaces of the internal space of the case. Therefore, the optical transceiver provides an effect of reducing both unnecessary electromagnetic wave radiation from the front, in other words, from a gap generated between the optical connector coupled to the optical fiber and the case component, and unnecessary electromagnetic wave radiation from the rear, in other words, from a gap generated between the electric connector coupled to the network device and the case component.

According to this embodiment, concerning the 100-Gbit/s-class dual mode optical transceiver compatible to both methods of electric modulation signals having bit rates of 25.78 Gbit/s and 27.95 Gbit/s, the optical transceiver capable of reducing cavity resonance in the metallic case can be achieved. Further, the optical transceiver capable of simultaneously reducing unnecessary electromagnetic waves and cost can be achieved.

This invention is not limited to the above-mentioned embodiment. The configuration may be replaced by a configuration substantially similar to that of the embodiment, a configuration capable of providing similar operations and effects, or a configuration capable of achieving the same object.

For example, as described above, the substrate holder 120 is made of the nylon resin. Not limited to this, however, for example, the substrate holder 120 may be made of a polystyrene (PS) resin or a polyphenylene sulfide (PPS) resin. For the resin of the substrate holder 120, the carbon black is used as the filler. Not limited to this, however, any material such as graphite, a carbon nanotube (CNT), or a carbon nanocoil can be used as long as a range of conductance of from 1 S/m to 1,000 S/m can be achieved at low cost.

As described above, the width of the substrate holder 120 is set equal to 95% of the width A of the internal space of the case. However, a value of the width W is not limited to this. Referring to the eigenmode shown in FIG. 6, a mode up to m=3 may be generated in the width direction of the internal space. In view of this, in order to deal with three peaks (antinodes) of electric field intensity of the mode of m=3, a width equal to or more than ⅔ of the width A of the internal space is required. Needless to say, it is preferred that the value of the width W be closer to the width A of the internal space of the case. However, the value of the width W may be selected within a range of from ⅔ to 1 (that is, from 67% to 100%) of the width A. The configuration or the like illustrated in FIGS. 1 to 9 is only an example, and this embodiment is not limited to this.

Second Embodiment

Next, a second embodiment of this invention is described. This embodiment is mainly different from the first embodiment in shape of a substrate holder. In the following, description of points similar to those of the first embodiment is omitted.

Figure 10:
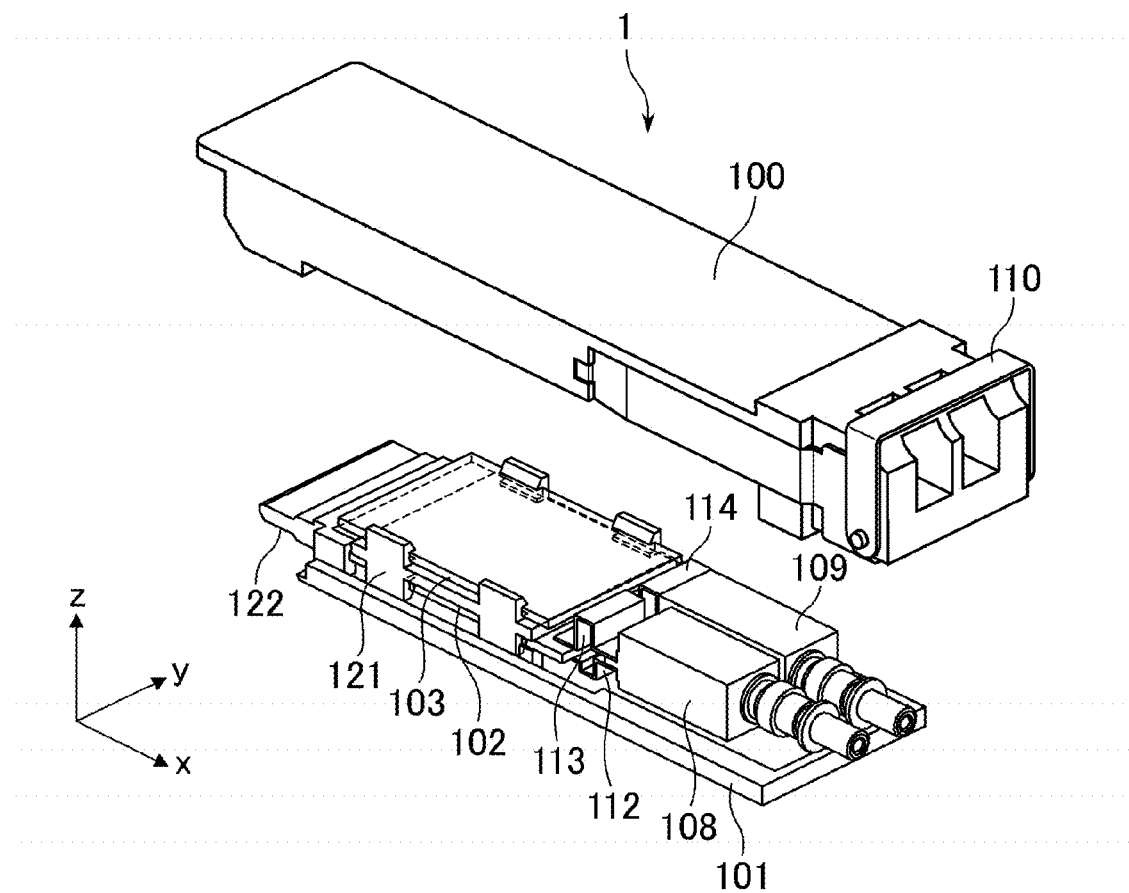
FIG. 10 is a vertically exploded perspective view for illustrating an internal structure of an optical transceiver according to a second embodiment of this invention.

FIG. 10 is a vertically exploded perspective view for illustrating an internal structure of an optical transceiver according to the second embodiment of this invention. FIG.

11 is a structural diagram for illustrating a substrate holder to be mounted on the optical transceiver according to the second embodiment of this invention.

Figure 11:
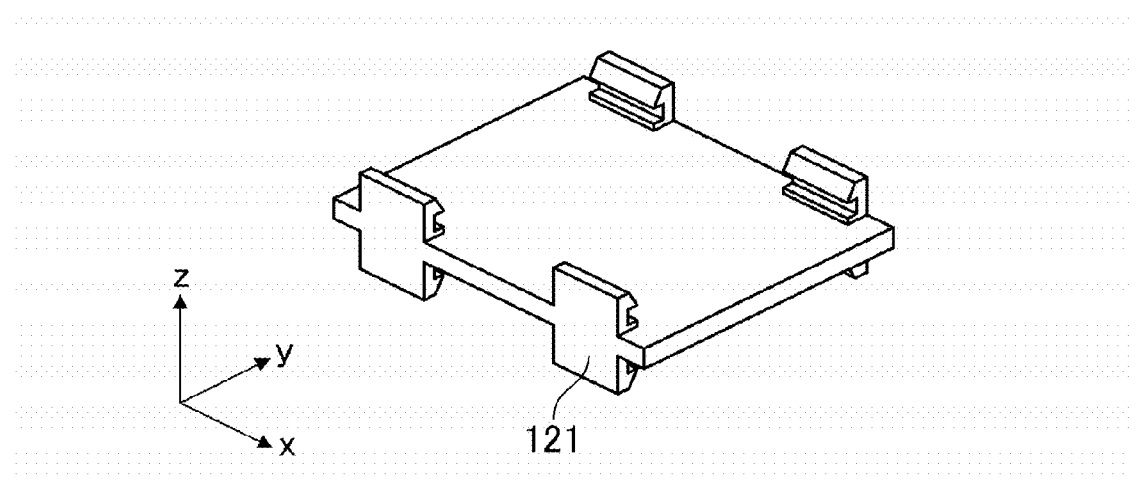
FIG. 11 is a structural diagram for illustrating a substrate holder to be mounted on the optical transceiver according to the second embodiment.

As illustrated in FIGS. 10 and 11, a substrate holder 121 has an extending part in a width direction of a case at a single location. The extending part has a planar shape of, for example, a width 19 mm (W) and a depth 24 mm. It is preferred that the substrate holder 121 be formed of a resistor having conductance set within a range of from 1 S/m to 1,000 S/m. Further, it is more preferred that the substrate holder 121 be formed of a resistor having conductance set within a range of from 10 S/m to 100 S/m. Specifically, for example, the substrate holder 121 may be made of a nylon resin using carbon black as a filler, and conductance thereof may be set to 10 S/m. The shape of the extending part of the resistor (substrate holder 121) illustrated in FIGS. 10 and 11 is only an example. Other shapes may be employed. For example, FIGS. 10 and 11 are illustrations of a case where the resistor has one planar shape. However, the resistor may have a plurality of adjacent planar shapes. The case where the substrate holder 121 is formed of the resistor has been described above. However, the resistor may be provided separately from the substrate holder 121. Specifically, for example, in this case, in place of forming the substrate holder 121 of the resistor, a resistor having a planar extending part in the width direction of the upper or lower case 100 or 101 may be provided separately from the substrate holder 121.

This embodiment provides the same effects as those of the first embodiment. Specifically, for example, concerning a 100-Gbit/s-class dual mode optical transceiver compatible to both methods of electric modulation signals having bit rates of 25.78 Gbit/s and 27.95 Gbit/s, a structure of the optical transceiver capable of reducing cavity resonance in the metallic case can be proposed. Further, the optical transceiver capable of simultaneously reducing unnecessary electromagnetic waves and cost can be achieved.

This invention is not limited to the above-mentioned second embodiment. The configuration may be replaced by a configuration substantially similar to that of the embodiment, a configuration capable of providing similar operations and effects, or a configuration capable of achieving the same object.

Third Embodiment

Next, a third embodiment of this invention is described. In the following, description of points similar to those of the first or second embodiment is omitted.

Figure 12:
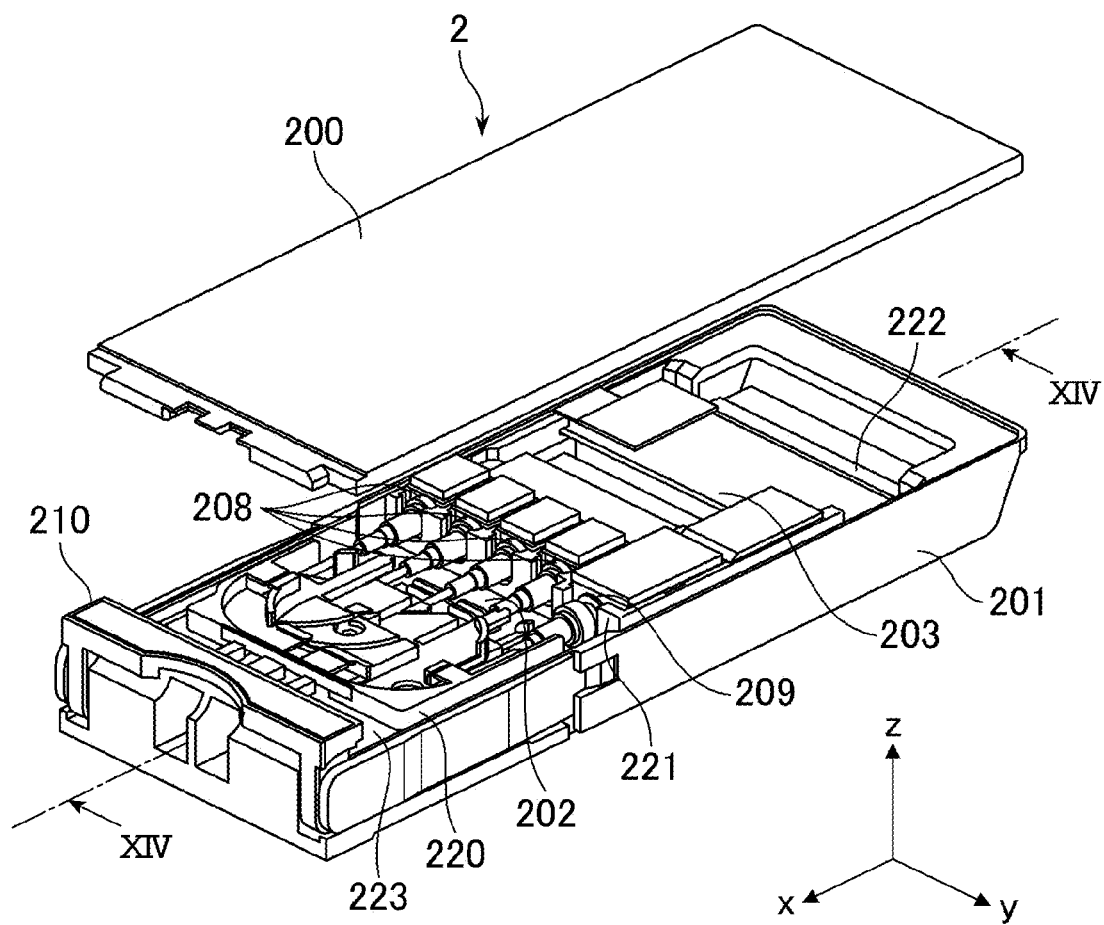
FIG. 12 is a vertically exploded perspective view for illustrating an internal structure of an optical transceiver according to a third embodiment of this invention.
Figure 13:
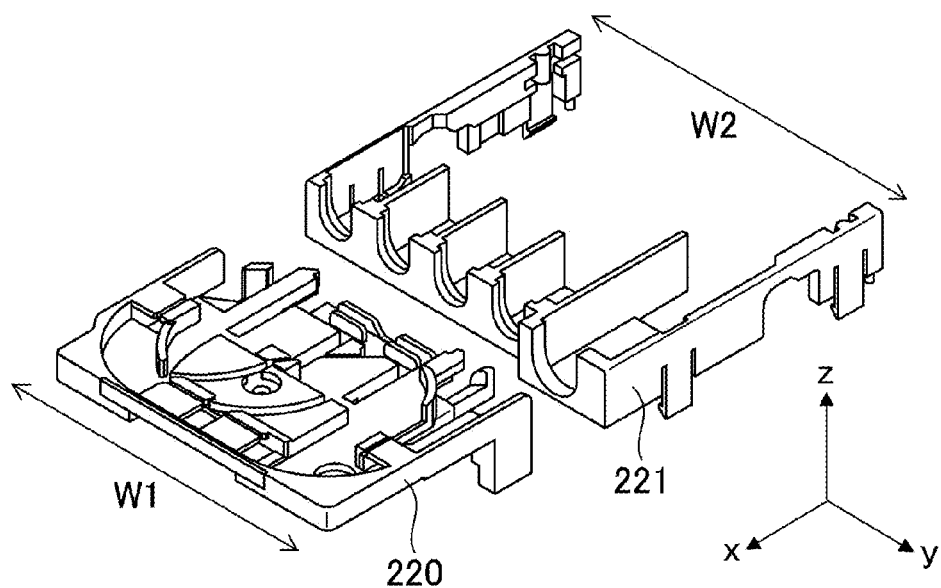
FIG. 13 is a structural diagram for illustrating two holders to be mounted on the optical transceiver according to the third embodiment.
Figure 14:
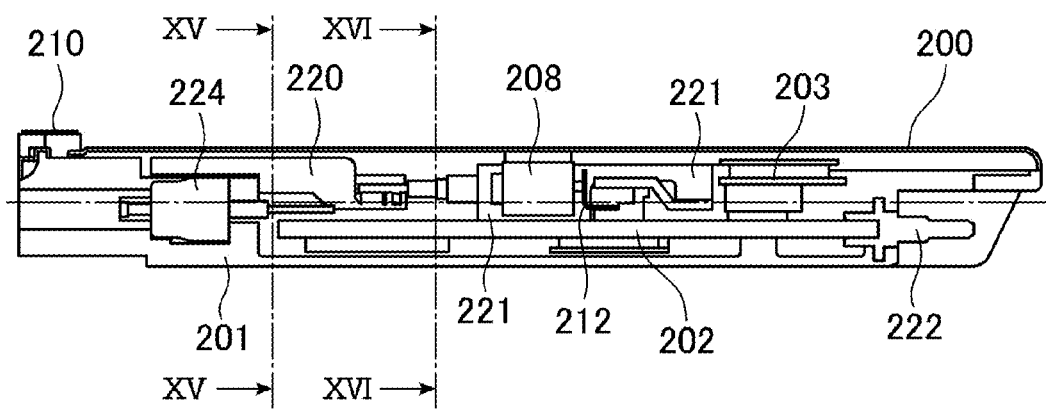
FIG. 14 is a sectional view of the optical transceiver according to the third embodiment seen from a side surface direction.
Figure 15:
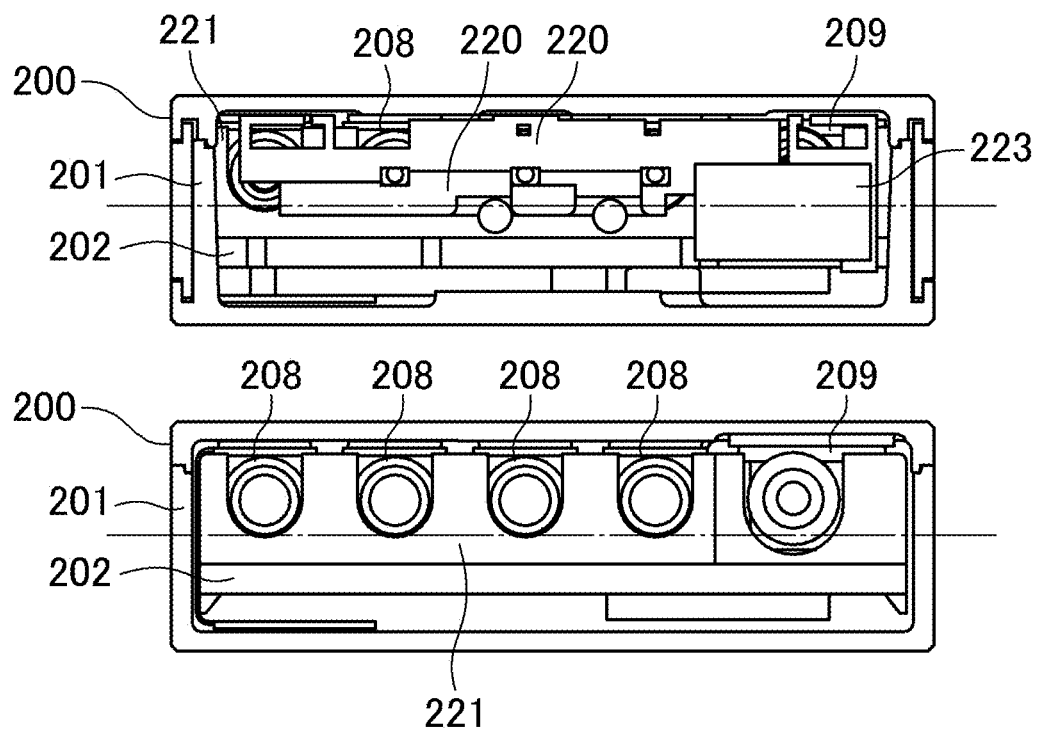
FIG. 15 is a sectional view of the optical transceiver according to the third embodiment at positions of the two holders seen from a front side.
Figure 17A:
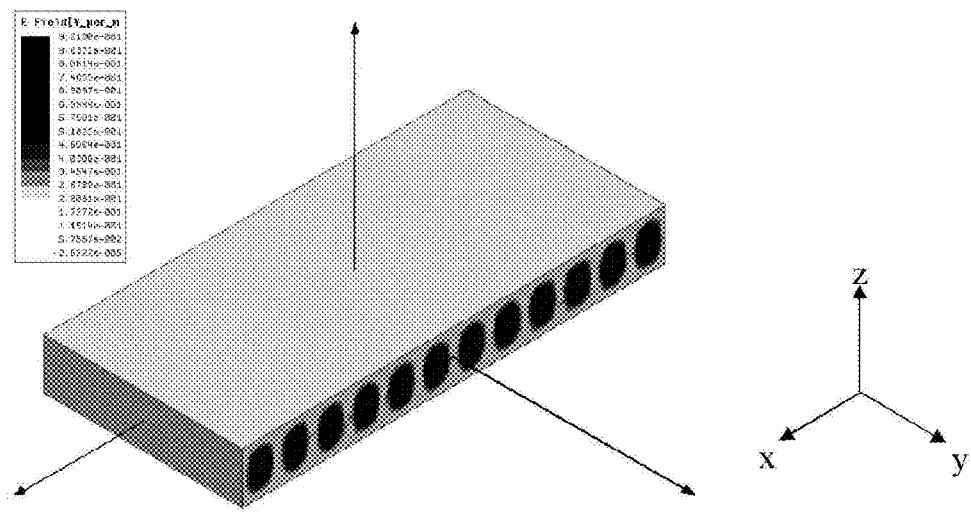
FIGS. 17A and 17B are diagrams each for illustrating an electric field intensity distribution of the eigenmode according to the third embodiment.
Figure 17B:
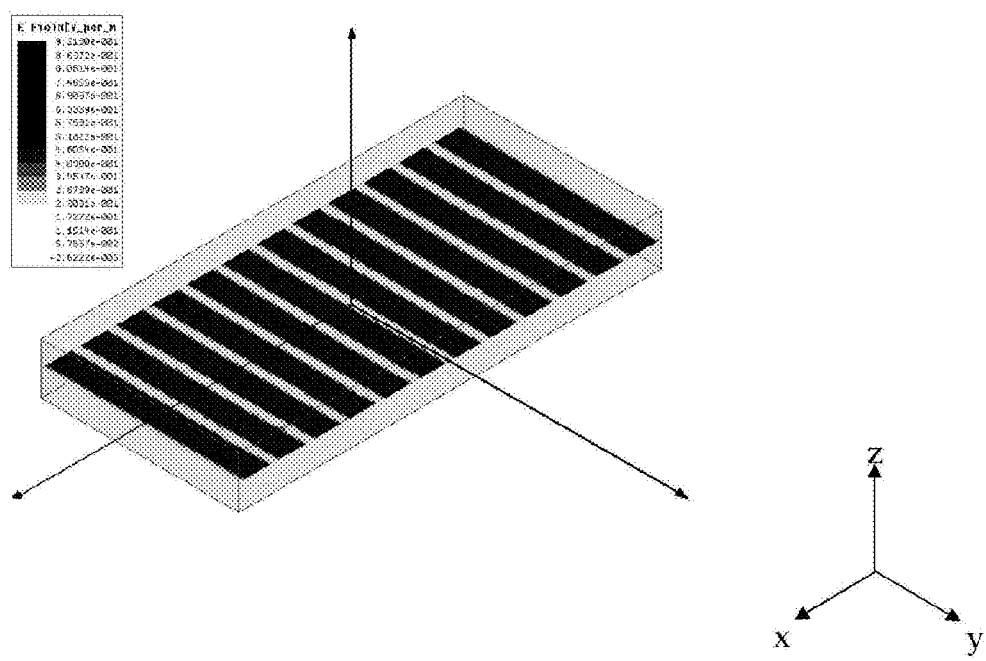
Figure 18A:
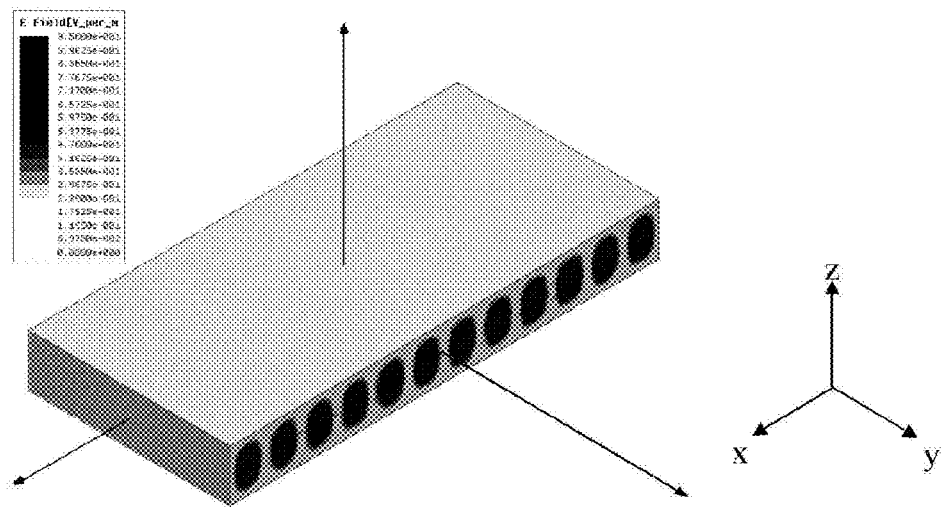
FIGS. 18A and 18B are diagrams each for illustrating an electric field intensity distribution of the eigenmode according to the third embodiment.
Figure 18B:
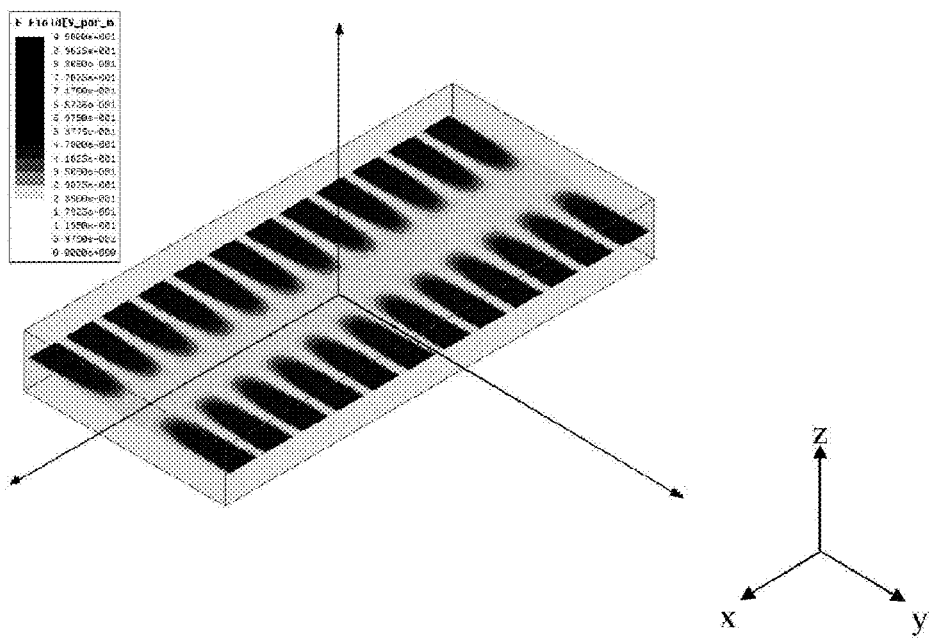
Figure 19:
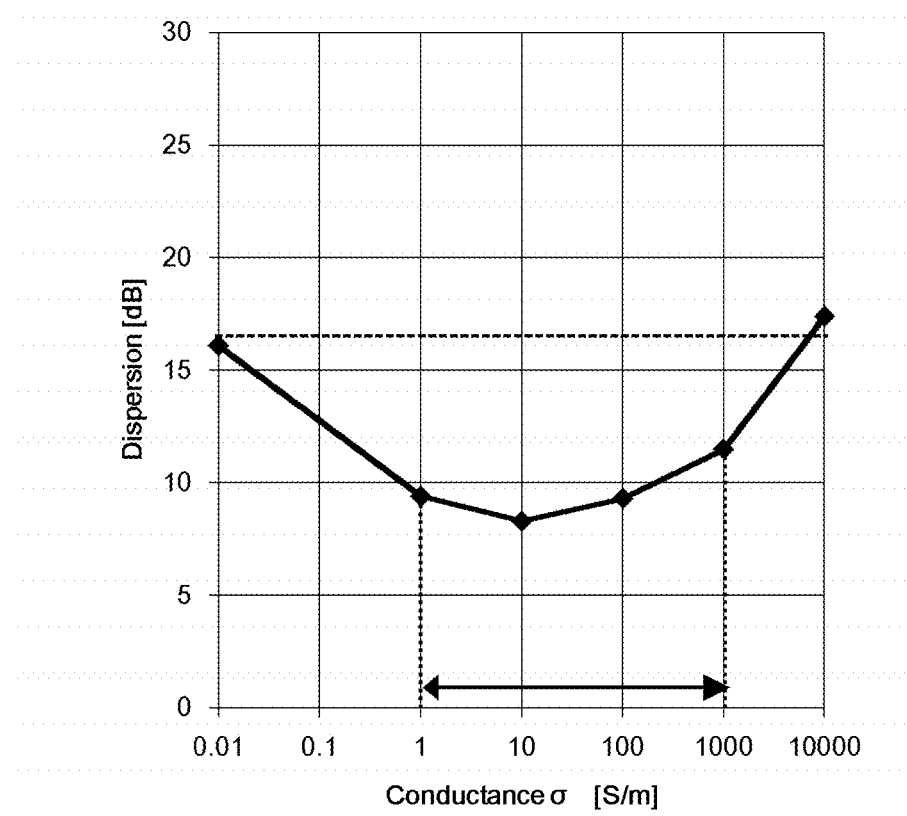
FIG. 19 is a graph for showing a calculation result of a dispersion of unnecessary electromagnetic wave intensity of the optical transceiver exhibiting effects according to the third embodiment.
Figure 20:
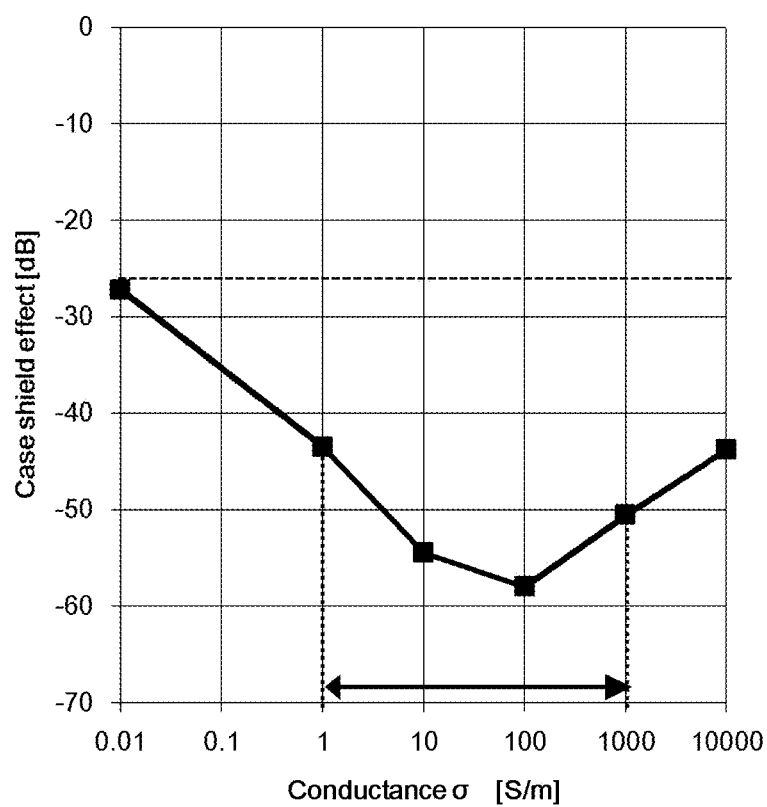
FIG. 20 is a graph for showing a calculation result of a case shield effect of the optical transceiver exhibiting effects according to the third embodiment.

The third embodiment of this invention is described referring to FIGS. 12 to 20. FIG. 12 is a vertically exploded perspective view for illustrating an internal structure of an optical transceiver according to the third embodiment. FIG. 13 is a structural diagram for illustrating two holders to be mounted on the optical transceiver according to the third embodiment. FIG. 14 is a sectional view of the optical transceiver according to the third embodiment seen from a side surface direction, in particular, is an illustration of a section at a position taken along the line XIV-XIV of FIG. 12. FIG. 15 is a sectional view of the optical transceiver according to the third embodiment at positions of the two holders seen from a front side, in which an upper part is an illustration of a section at a position taken along the line XV-XV of FIG. 14, and a lower part is an illustration of a section at a position taken along the line XVI-XVI of FIG. 14. FIG. 16 is a table for showing an eigenmode of cavity resonance. FIGS. 17A to 18B are diagrams each for illustrating an electric field intensity distribution of the eigenmode. FIG. 19 is a graph for showing a calculation result of a dispersion of unnecessary electromagnetic wave intensity of the optical transceiver exhibiting effects according to the third embodiment. FIG. 20 is a graph for showing a calculation result of a case shield effect of the optical transceiver exhibiting effects according to the third embodiment.

The optical transceiver according to the third embodiment is, for example, an optical transceiver 2 compliant with CFP2 MSA Standard. First, referring to FIGS. 12 to 15, a configuration of the optical transceiver 2 according to this embodiment is described.

In FIG. 12, an outer side of the optical transceiver 2 mainly includes an upper case 200, a lower case 201, and a bail 210. In the following, an x direction, an opposite direction thereof (-x direction), a z direction, and an opposite direction thereof (-z direction) in FIG. 12 are respectively defined to be a front direction, a rear direction, an upper direction, and a lower direction.

The optical transceiver 2 is operated by inserting the optical transceiver 2 into a network device (not shown) from a rear side and inserting a connector of an optical fiber from a front side. In FIG. 12, in a cavity space formed by the upper case 200 and the lower case 201, two printed circuit boards 202 and 203, a fiber holder 220, an optical multiplexer 223, a receptacle fiber connector 224, four transmitter optical sub-assemblies (TOSAs) 208, a receiver optical sub-assembly (ROSA 209), and an OSA holder 221 are arranged. A flexible printed board 212 or the like is arranged between the printed circuit board 202 and each of the TOSAs 208 and the ROSA 209, and main signal wiring, grounding wiring, voltage supply wiring, or current supply wiring of 25 Gbit/s (or 28 Gbit/s) is coupled thereto.

On the printed circuit board 202, a main signal processing IC or a chip component of clock data recovery (CDR) or the like (not shown) is mounted. On the rear side of the printed circuit board 202, a plug connector 222 is arranged to be used for coupling to the network device. The plug connector 222 electrically couples differential signals of 25 Gbit/s (or 28 Gbit/s) or the like of totally eight channels, namely, four channels for a transmission side and four channels for a reception side between the printed circuit board 202 and the network device. The plug connector 222 is exposed to the outside through slots on rear sides of the upper and lower cases 200 and 201, and functions to insert/remove a live wire.

The fiber holder 220 functions to bundle and hold four optical fibers extending from the four TOSAs 208 to the optical multiplexer 223 and extra-length parts of optical fibers one each extending from the optical multiplexer 223 and the ROSA 209 to the receptacle fiber connector 224. While dependent on a size of the space formed by the upper and lower cases 200 and 201, a width of the fiber holder 220 is set to, for example, 34.6 mm (W1).

As illustrated in FIG. 13, the fiber holder 220 has an extending part in a width direction of the upper or lower case 200 or 201. It is preferred that the fiber holder 220 be formed of a resistor having conductance set within a range of from 1 S/m to 1,000 S/m. Further, it is more preferred that the fiber holder 220 be formed of a resistor having conductance set within a range of from 10 S/m to 100 S/m. Specifically, for example, the fiber holder 220 is made of a nylon resin using carbon black as a filler, and conductance thereof is set to 10 S/m.

The OSA holder 221 functions to hold the four TOSAs 208 and the one ROSA 209. By the OSA holder 221, positions of the four TOSAs 208 and the one ROSA 209 relative to the printed circuit board 202 are fixed. While dependent on a size of the space formed by the upper and lower cases 200 and 201, a width of the OSA holder 221 is set to, for example, 38.5 mm (W2).

As illustrated in FIG. 13, the OSA holder 221 has an extending part in a width direction of the upper or lower case 200 or 201. It is preferred that the OSA holder 221 be formed of a resistor having conductance set within a range of from 1 S/m to 1,000 S/m. Further, it is more preferred that the OSA holder 221 be formed of a resistor having conductance set within a range of from 10 S/m to 100 S/m. Specifically, for example, the OSA holder 221 is made of a nylon resin using carbon black as a filler, and conductance thereof is set to 10 S/m.

As materials for the upper and lower cases 200 and 201, metals such as zinc or aluminum are used. The upper and lower cases 200 and 201 may be formed by cutting. However, the upper and lower cases 200 and 201 can be integrally formed at low cost by die-casting. While dependent on thicknesses of the upper and lower cases 200 and 201, the size of the internal space formed by the upper and lower cases 200 and 201 is set to, for example, a width of 40.0 mm (A), a height of 10.4 mm (B), and a depth of 85.4 mm (C).

When presuming that the optical transceiver 2 is designed to be compatible to both methods of 25.78 Gbit/s and 27.95 Gbit/s (dual mode), frequencies of unnecessary electromagnetic waves to be taken into consideration are frequencies of 25.78 GHz and 27.95 GHz. Wavelengths $\lambda g$ in free spaces of the respective frequencies are 11.6 mm and 10.7 mm. The height 10.4 mm (B) of the internal space is a value larger than ½ (5.8 mm and 5.35 mm) of the wavelengths $\lambda g$. The height 10.4 mm (B) of the internal space is the value not exceeding the wavelengths $\lambda g$ (11.6 mm and 10.7 mm).

As illustrated in FIGS. 12, 14, and 15, the fiber holder 220 and the OSA holder 221 are arranged between upper and lower surfaces of the internal space of the case. Specifically, for example, a height center (indicated by the chain lines in FIGS. 14 and 15) of the internal space is set so as to pass through at least parts of the fiber holder 220 and the OSA holder 221. As illustrated in the sectional view of FIG. 15, the width W1 of the fiber holder 220 is extended to be close to a width A of the case internal space. Specifically, in FIG. 15, for example, the width W1 is set to a size equivalent to 86.5% of the width A. The width W2 of the OSA holder 221 is extended to be close to the width A of the case internal space. In FIG. 15, for example, the width W2 is set to a size equivalent to 96% of the width A. FIG. 14 is an example of a sectional view in the y direction of FIG. 12, and FIG. 15 is an example of sectional views in the x direction and the opposite direction thereof of FIG. 12.

Next, referring to FIGS. 16 to 20, operations and effects of the optical transceiver 2 according to this embodiment are described. For example, in the case of the optical transceiver 2 compliant with the CFP4 MSA, an external dimension is defined by the MSA, and a size of the internal space is a value obtained by subtracting the thickness of the case from the external dimension. Specifically, for example, the dimension of the internal space is 40 mm×10.4 mm×85.4 mm.

Similarly to the first embodiment, conditions for generating a standing wave in a cavity height direction of the rectangular parallelepiped can be calculated by the expression (1). With n=1, specifically, to generate an antinode at a height center and nodes at upper and lower ends in the electric field intensity distribution, when a wavelength in a free space of an electromagnetic wave is $\lambda g$ ($=c/f$), at least B needs to be larger than $\lambda g/2$. Further, with n=2, specifically, to generate nodes at the height center and the upper and lower ends and antinodes at heights ¼×B and ¾×B in the electric field intensity distribution, at least B needs to be larger than $\lambda g$.

Wavelengths $\lambda g$ in the free space at frequencies 25.78 GHz and 27.95 GHz are 11.6 mm and 10.7 mm. In the case of the CFP2, the height B of the internal space is 10.4 mm, and thus an eigenmode of n=1 is generated while no eigenmode of n=2 (or more) is generated.

In order to efficiently attenuate the eigenmode of n=1, a resistor having a horizontally extending part may be arranged at the height center of the internal space, in other words, a part that is the antinode in the electric field intensity distribution, and surface impedance thereof may be adjusted to a value in which reflection of the electromagnetic wave is difficult to occur. With an eigenmode of n=0, a similar electric field distribution occurs at any position in the height direction. Thus, the eigenmode can be attenuated with the above-mentioned arrangement of the resistor. No eigenmode of n=2 is generated, and thus the above-mentioned arrangement of the resistor can deal with all the eigenmodes.

FIGS. 16 to 18B are results of calculating eigenmodes generated in the cavity of the rectangular parallelepiped by a three-dimensional electromagnetic field analysis method. As shown in the table of FIG. 16, a large number of eigenmodes are present near the frequencies of 25.78 GHz and 27.95 GHz. A frequency of each eigenmode matches the expression (1) well and, as predicted above, a mode of n=1 is generated while no mode of n=2 is generated. A mode in which one of n, m, ands is 0 is only a transverse electric mode (TE mode). However, in a mode where none of n, m, and s is 0, two modes, namely, a TE mode and a transverse magnetic mode (TM mode), are degenerated.

FIGS. 17A to 18B are examples of electric field intensity distributions of eigenmodes. FIGS. 17A and 17B respectively are an electric field intensity distribution on a conducting wall surface and an electric field intensity distribution on a surface of the height center of a (0, 1, 12) TE mode generated at a frequency of 25.52 GHz. A magnitude of electric field intensity is indicated by gradation. As the gray level is higher, the electric field intensity is higher. As the gray level is lower, the electric field intensity is lower. An antinode part in which electric field intensity is high is generated on a surface of a center. In order to efficiently attenuate this eigenmode, a wide resistor having a horizontally extending part may be arranged at substantially the height center.

On the other hand, no electric field is generated in upper and lower surfaces. Thus, for example, even when resistors are arranged in the upper and lower surfaces (i.e., top and bottom surfaces in the case), attenuation effect cannot be obtained for this eigenmode.

FIGS. 18A and 18B respectively are an electric field intensity distribution on a conducting wall surface and an electric field intensity distribution on a surface of the height center of a (1, 1, 12) TM mode generated at a frequency of 25.80 GHz. An antinode part in which electric field intensity is high is generated on a surface of a center. In order to efficiently attenuate this eigenmode, a wide resistor having a horizontally extending part may be arranged at the height center. On the other hand, no electric field is generated in upper and lower surfaces. Thus, even when resistors are arranged in the upper and lower surfaces (i.e., top and bottom surfaces in the case), attenuation effect cannot be obtained for this eigenmode.

Thus, our studies have discovered that by arranging the resistor between the upper and lower surfaces of the internal space of the case and forming the resistor into the shape having the extending part in the case width direction, all the eigenmodes near 25 GHz and 28 GHz possibly generated inside the case of the optical transceiver can be attenuated.

In an actual optical transceiver 2, a shape of an internal space surrounded with upper and lower cases is not limited to a rectangular parallelepiped. Components made of metals such as TOSA and ROSA are arranged. Accordingly, a resonance phenomenon becomes more complex. However, the above-mentioned mechanism similarly functions.

FIGS. 19 and 20 are graphs respectively for showing, based on a result of calculating unnecessary electromagnetic wave intensity in a structure of the optical transceiver illustrated in FIG. 12 by a three-dimensional electromagnetic field analysis method, a dispersion within a frequency range of from 25.78 GHz to 28.25 GHz (FIG. 19), and an expected case shield amount with the dispersion taken into consideration (FIG. 20). A horizontal axis of each graph indicates conductance of each of the fiber and OSA holders 220 and 221 that are resistors and, by using this value as a parameter, a study has been conducted within a range of from 0.1 S/m to 10,000 S/m. For comparison, results when the fiber and OSA holders 220 and 221 are made of general plastics (conductance 0) in the same structure (Comparative Example) are indicated by the broken lines in FIGS. 19 and 20. In Comparative Example, a large number of strong resonance modes were observed in the case, and unnecessary electromagnetic wave intensity greatly fluctuated with a change of a frequency. A dispersion thereof exceeded 16 dB. On the other hand, when the fiber and OSA holders 220 and 221 were resistors, resonance in the case was suppressed, and a dispersion of unnecessary electromagnetic wave intensity caused by a frequency change was successfully reduced.

Specifically, as shown in FIG. 19, the dispersion can be reduced by 5 dB to 8 dB by setting the conductance of the resistor within the range of from 1 S/m to 1,000 S/m. In particular, in the case of 10 S/m, an effect of suppressing the dispersion to 8 dB can be provided. Further, as shown in FIG. 20, by setting the conductance of the resistor within the range of from 1 S/m to 1,000 S/m, an effect of improving a case shield effect by 16 dB to 30 dB can be provided. As can be understood from FIGS. 19 and 20, it is more preferred that the conductance of the resistor be set within a range of from 10 S/m to 100 S/m.

The extending parts are formed in the case width direction at the two locations near the front end in the case and the front end of the printed circuit board 202, and the resistors (fiber and OSA holders 220 and 221) are arranged between the upper and lower surfaces of the internal space of the case. This provides an effect of more effectively reducing unnecessary electromagnetic wave radiation from the front, in other words, from a gap generated between the optical connector coupled to the optical fiber and the case component.

According to this embodiment, there can be proposed, for example, concerning a 100-Gbit/s-class dual mode optical transceiver compatible to both methods of electric modulation signals having bit rates of 25.78 Gbit/s and 27.95 Gbit/s, a structure of the optical transceiver capable of reducing cavity resonance in the metallic case. Further, the optical transceiver capable of simultaneously reducing unnecessary electromagnetic waves and cost can be achieved.

This invention is not limited to the above-mentioned first to third embodiments. The configuration may be replaced by a configuration substantially similar to those of the first to third embodiments, a configuration capable of providing similar operations and effects, or a configuration capable of achieving the same object.

For example, according to the third embodiment, the width W1 of the fiber holder 220 is set equal to 86.5% of the width A of the internal space of the case, and the width W2 of the OSA holder 221 is set equal to 96% of the width A of the internal space of the case. However, values of the widths W1 and W2 are not limited to these. Referring to the eigenmode shown in FIG. 16, a mode up to m=7 may be generated in the width direction of the internal space. In view of this, in order to deal with seven peaks (antinodes) of electric field intensity of the mode of m=7, a width equal to or more than 6/7 of the width A of the internal space is required. Needless to say, it is preferred that the values of the widths W1 and W2 be closer to the width A. However, the values of the widths W1 and W2 may be selected within a range of from 6/7 to 1 (that is, from 86% to 100%) of the width A.

According to the third embodiment, the optical transceiver 2 is the optical transceiver compliant with the CFP2 MSA Standard, in other words, a 4-wavelength multiplexed optical transceiver. However, the optical transceiver 2 may be a long-distance coherent optical transceiver referred to as a CFP2 analog coherent optics (CFP2-ACO). In this case, while an external dimension of the optical transceiver is similar, types of internally-mounted components and frequencies of concern are different. In the CFP2-ACO, for optical signal modulation, multi-level modulation such as dual-polarization quadrature phase shift keying (DP-QPSK) is used, and an optical signal of 128 Gbit/s (more specifically, 127.156 GHz) is transmitted/received by one wavelength. Between the network device and each of the plug connector 122 and the printed circuit board 202, electric differential modulation signals of totally eight channels, namely, four channels for a transmission side and four channels for a reception side having symbol rates of 31.789 Gbaud, flow. A frequency of an unnecessary electromagnetic wave to be taken into consideration is 31.789 GHz. A wavelength $\lambda g$ in a free space at this frequency is 9.44 mm. Accordingly, in the case of the CFP2-ACO, the height B of the internal space is not 10.4 mm, but is changed to be equal to or less than 9.44 mm.

The third embodiment has been directed to the case where the fiber and OSA holders 220 and 221 are used as resistors. However, the fiber and OSA holders 220 and 221 may be integrally formed. Further, resistors may be provided separately from the fiber and OSA holders 220 and 221, and arranged in the upper and lower surfaces of the internal space of the case. Specifically, for example, in this case, in place of forming the fiber and OSA holders 220 and 221 of the resistors, a resistor having a planar extending part in the width direction of the upper or lower case 200 or 201 may be provided separately from the fiber and OSA holders 220 and 221. For materials of the resistors, for example, carbon black or graphite may be used as a filler for polycarbonate, nylon 6, polyarylate, or polypropylene carbonate. The resistor may be, for example, a polystyrene (PS) resin or a polyphenylene sulfide (PPS) resin. As described above, for the resin of the resistor, the carbon black is mainly used as the filler. However, the filler is not limited to this. Specifically, as long as a range of conductance of from 1 S/m to 1,000 S/m can be achieved at low cost, any material such as graphite, a carbon nanotube (CNT), or a carbon nanocoil may be used.

Further, the first to third embodiments have been described byway of example where the resistors not only function for attenuating the electric field intensity but also function as the substrate, fiber, and OSA holders. However, a suitable plate-like resistor or the like may be arranged only for attenuating the electric field intensity. However, it is preferred that a resistor having a certain function be used in order to achieve low cost.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical transceiver, which is configured to use, as an electric signal, a digital modulation signal having a predetermined bit rate, the optical transceiver comprising:
   a case having a space for storing a component therein; and
   a resistor being arranged between upper and lower surfaces of the space and having conductance of from 1 S/m to 1,000 S/m,
   wherein the space has a height equal to or less than a wavelength in a free space of an electromagnetic wave of a frequency corresponding to the predetermined bit rate,
   wherein at least a part of the height of the space is larger than a half of the wavelength,
   wherein the height of the space is smaller than a width of the space, and
   wherein the width of the space is smaller than a depth of the space.

2. The optical transceiver according to claim 1, wherein at least a part of the resistor is positioned at a height-direction center of the space formed in the case.

3. The optical transceiver according to claim 1, wherein:
   the bit rate is equal to or less than 25.78 Gbit/s; and
   the height of the space is less than 11.6 mm.

4. The optical transceiver according to claim 1, wherein:
   the bit rate is one of 25.78 Gbit/s and 27.95 Gbit/s;
   at least a part of the height of the space is larger than 5.8 mm; and
   the height of the space is less than 10.7 mm.

5. The optical transceiver according to claim 1, wherein the resistor has an extending part in a width direction of the case.

6. The optical transceiver according to claim 1, wherein a width of the resistor is set to a value of 86% or more and 100% or less of a width of the case.

7. The optical transceiver according to claim 1, wherein the resistor comprises a nonmagnetic member.

8. The optical transceiver according to claim 1, wherein the resistor is made of a material using one of graphite and carbon black as a filler in resin.

9. The optical transceiver according to claim 1, wherein the resistor comprises a support member configured to support the component.

10. The optical transceiver according to claim 9, wherein the component comprises at least one of an optical fiber or an optical element module.

11. The optical transceiver according to claim 9, wherein:
    the component comprises two printed circuit boards; and
    a part of the resistor having an extending part in a width direction of the case is positioned between the two printed circuit boards.

* * * * *